(12) United States Patent
Yamada

(10) Patent No.: US 8,115,959 B2
(45) Date of Patent: Feb. 14, 2012

(54) IMAGE PROCESSING DEVICE

(75) Inventor: Akihiro Yamada, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 1009 days.

(21) Appl. No.: 12/073,015

(22) Filed: Feb. 28, 2008

(65) Prior Publication Data

US 2008/0204804 A1 Aug. 28, 2008

(30) Foreign Application Priority Data

Feb. 28, 2007 (JP) ................................. 2007-049676

(51) Int. Cl.
G06F 15/00 (2006.01)
G06K 15/00 (2006.01)
G06K 1/00 (2006.01)

(52) U.S. Cl. ...................................... 358/1.16; 358/1.13
(58) Field of Classification Search ......................... None
See application file for complete search history.

(56) References Cited

U.S. PATENT DOCUMENTS

| 6,111,659 | A | 8/2000 | Murata |
| 6,194,712 | B1 | 2/2001 | Suemoto et al. |
| 6,330,067 | B1 | 12/2001 | Murata |
| 6,606,161 | B2 | 8/2003 | Murata |
| 6,734,988 | B2 | 5/2004 | Murata |
| 6,750,987 | B1 | 6/2004 | Murata |
| 6,801,327 | B1 * | 10/2004 | Haneda et al. ................. 358/1.1 |
| 6,924,902 | B2 | 8/2005 | Murata |
| 6,943,906 | B2 | 9/2005 | Murata |
| 7,054,028 | B2 | 5/2006 | Murata |
| 2003/0184803 | A1 | 10/2003 | Yamada et al. |
| 2006/0109507 | A1 | 5/2006 | Murata |

FOREIGN PATENT DOCUMENTS

| JP | 05-037747 | 2/1993 |
| JP | 5-40817 | 2/1993 |
| JP | 7-7609 | 1/1995 |
| JP | 9-93376 | 4/1997 |
| JP | 9-200461 | 7/1997 |
| JP | 10-4499 | 1/1998 |

(Continued)

OTHER PUBLICATIONS

Japanese Office Action, with English translation, issued in Japanese Patent Application No. JP 2007-049676, mailed Jan. 27, 2009.

*Primary Examiner* — Douglas Tran
(74) *Attorney, Agent, or Firm* — Banner & Witcoff, Ltd.

(57) ABSTRACT

An image scanning device to which an external storage is detachably connected. The image scanning device is provided with an image scanning unit configured to scan an image formed on an original document and generate data representing the scanned image, a data storing unit configured to store the data generated by the image scanning unit in the external storage connected to the image scanning device, a capacity presuming unit configured to presume a necessary capacity which should be available in the external storage for storing the data generated by the image scanning unit prior to storing the data, a comparing unit configured to detect a remaining capacity of the external storage and compare the remaining storage with the necessary capacity presumed by the capacity presuming unit, and a warning unit configured to issue warning if the remaining capacity is less than the necessary capacity.

11 Claims, 8 Drawing Sheets

FOREIGN PATENT DOCUMENTS

| | | |
|---|---|---|
| JP | 11-112720 | 4/1999 |
| JP | 2000-29646 | 1/2000 |
| JP | 2004-7517 | 1/2004 |
| JP | 2004-42404 | 2/2004 |
| JP | 2004-72762 | 3/2004 |
| JP | 2004-96511 | 3/2004 |
| JP | 2006-186631 | 7/2006 |
| JP | 2006-209385 | 8/2006 |

* cited by examiner

| COVERAGE (%) | PRESUMED COMPRESSION RATIO (JPEG) | PRESUMED COMPRESSION RATIO (TIFF) |
|---|---|---|
| 0 | $\alpha_0$ | $\beta_0$ |
| 20 | $\alpha_{20}$ | $\beta_{20}$ |
| 40 | $\alpha_{40}$ | $\beta_{40}$ |
| 60 | $\alpha_{60}$ | $\beta_{60}$ |
| 80 | $\alpha_{80}$ | $\beta_{80}$ |
| 100 | $\alpha_{100}$ | $\beta_{100}$ |

FIG. 8

IMAGE PROCESSING DEVICE

CROSS-REFERENCE TO RELATED APPLICATION

This application claims priority under 35 U.S.C. §119 from Japanese Patent Application No. 2007-049676 filed on Feb. 28, 2007. The entire subject matter of the application is incorporated herein by reference.

BACKGROUND

1. Technical Field

The following description relates to an image scanning device capable of scanning an image on an original document to obtain image data and storing the image data in an external storage.

2. Related Art

Conventionally, there is known a scanning device provided with an image scanning unit for scanning an image on an original document to generate image data representing the scanned image, and a data storing unit for storing the obtained image data in an external storage such as a portable recording medium (e.g., a USB memory).

An example of such an image scanning device is disclosed in Japanese Patent Provisional Publication No. 2004-42404 (hereinafter, referred to as '404 publication). According to '404 publication, before scanning the image on the original document, a remaining capacity of the external storage is checked, and if the remaining capacity is not sufficient, warning message is displayed.

SUMMARY OF THE INVENTION

According to '404 publication, however, whether the remaining capacity of the external storage is sufficient is judged regardless of the size of the image data obtained by scanning the image on the original document. Therefore, there could occur a case where the external storage becomes full when the image data is being stored, or the warning message may be displayed although the size of the image data would be relatively small and the remaining capacity is sufficient to store such data.

In consideration of the above problem, the present invention is advantageous in that an improved image scanning device is provided, with which it is possible to prevent a case where the external storage becomes full when the image data is being stored, or a case where the warning message is displayed although the remaining capacity is sufficient to accommodate the image data.

According to aspects of the invention, there is provided an image scanning device to which an external storage is detachably connected. The image scanning device is provided with an image scanning unit configured to scan an image formed on an original document and generate data representing the scanned image, a data storing unit configured to store the data generated by the image scanning unit in the external storage connected to the image scanning device, a capacity presuming unit configured to presume a necessary capacity which should be available in the external storage for storing the data generated by the image scanning unit prior to storing the data, a comparing unit configured to detect a remaining capacity of the external storage and compare the remaining storage with the necessary capacity presumed by the capacity presuming unit, and a warning unit configured to issue warning if the remaining capacity is less than the necessary capacity.

According to aspects of the invention, there is provided a method of storing data for an image scanning device to which an external storage is detachably connected and the data acquired by scanning an image is stored in the external storage. The method is provided with the steps of (a) scanning an image formed on an original document and generate the data representing the scanned image, (b) storing the data in the external storage, (c) presuming a necessary capacity which should be available in the external storage for storing the data prior to storing the data in the external storage, (d) detecting a remaining capacity of the external storage, (e) comparing the remaining storage with the necessary capacity, and (f) issuing a warning if the remaining capacity is less than the necessary capacity.

With the above configuration, improved image scanning device and method are realized, with which it is possible to prevent a case where the external storage becomes full when the image data is being stored, or a case where the warning message is displayed although the remaining capacity is sufficient to accommodate the image data.

BRIEF DESCRIPTION OF THE ACCOMPANYING DRAWINGS

FIG. 8 shows a table indicating mean coverage values and presumed compression ratios stored in a ROM.

DETAILED DESCRIPTION OF THE EMBODIMENT

Hereinafter, referring to the accompanying drawings, an image scanning device according to an embodiment will be described in detail.

Figure 1:
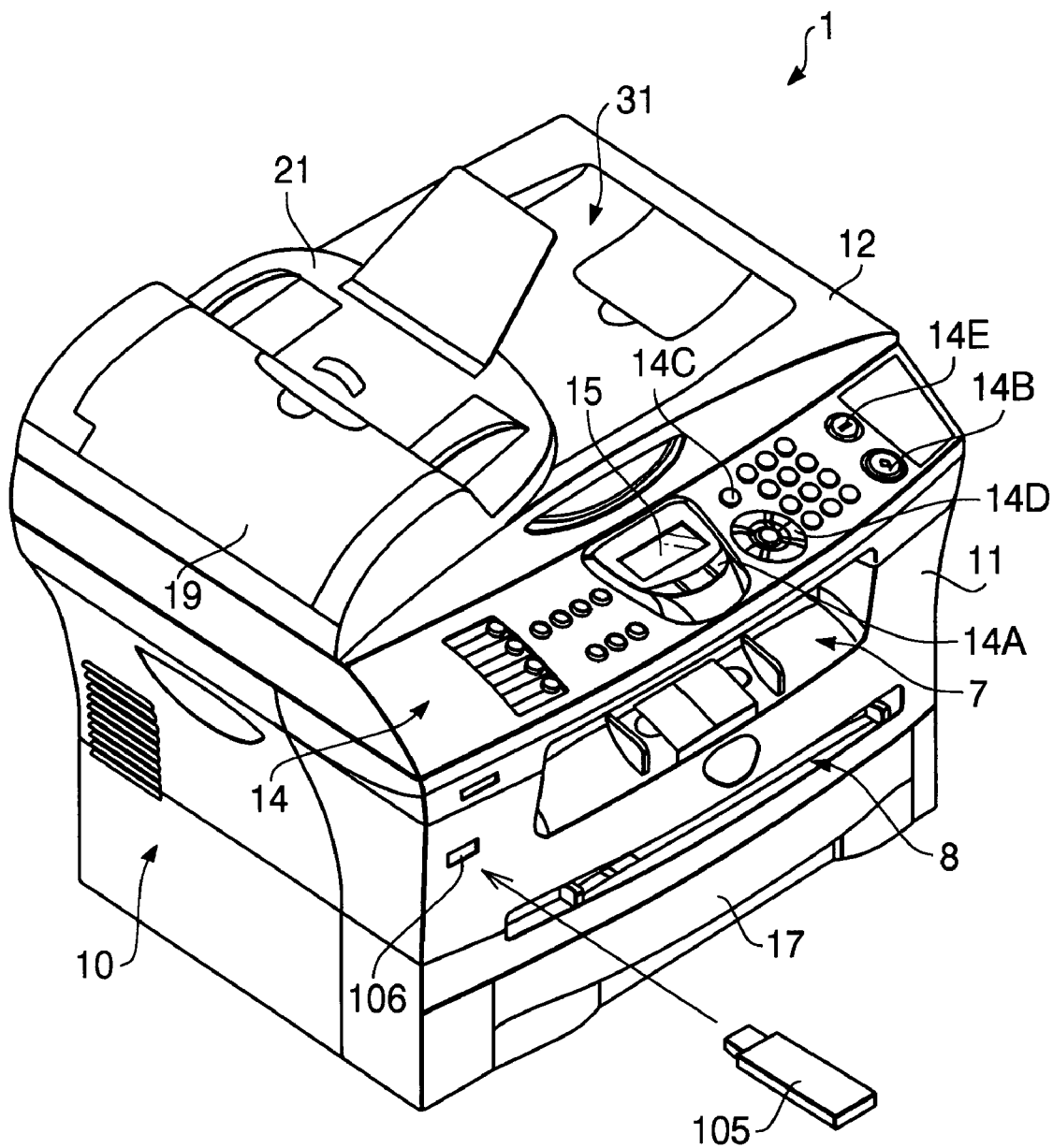
FIG. 1 is a perspective view of an MFP (Multi Function Peripheral) according to an aspect of the invention.
Figure 2:
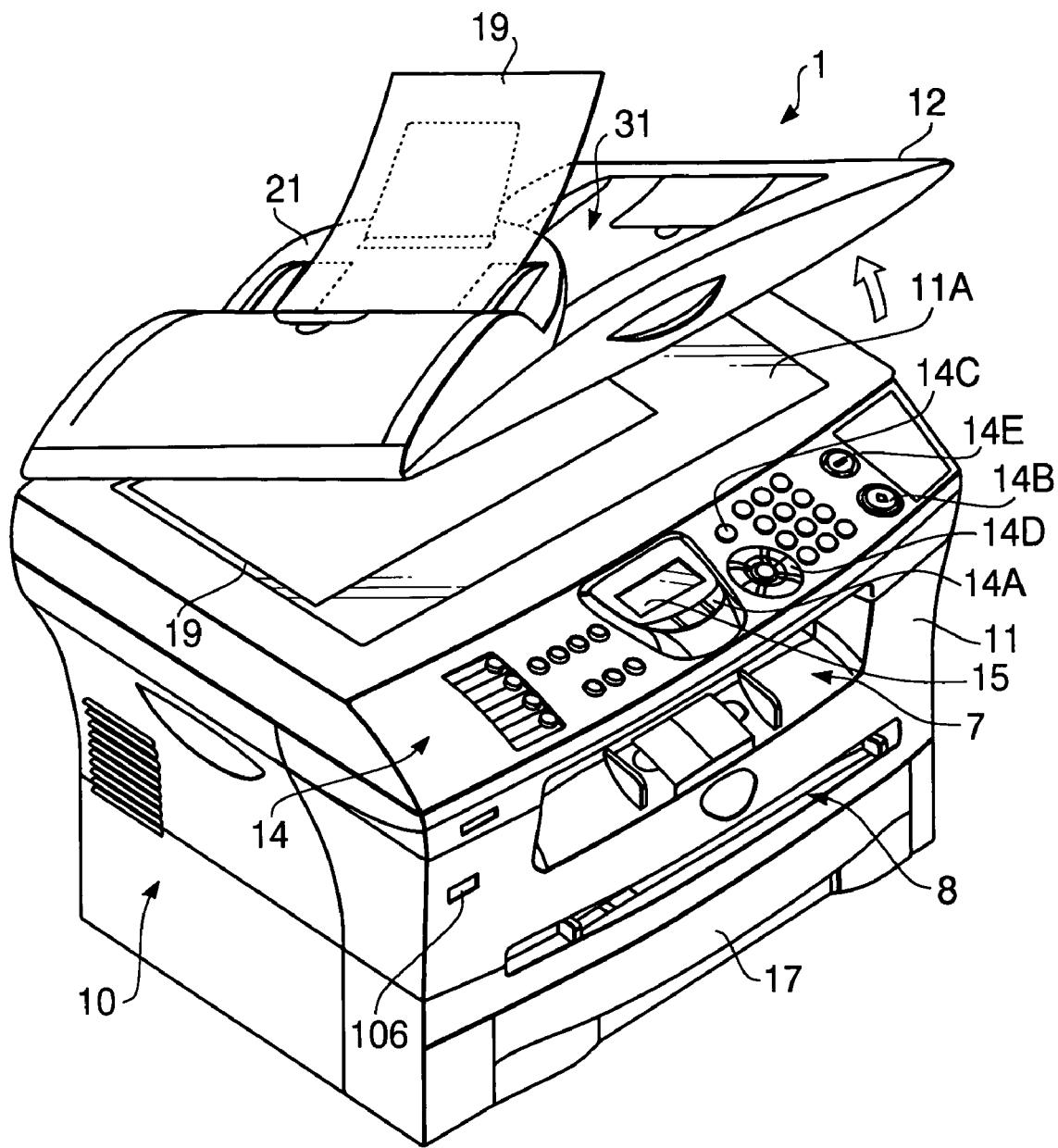
FIG. 2 is a perspective view of the MFP shown in FIG. 1 when a cover is opened.

FIG. 1 is a perspective view of an appearance of an MFP (Multi Function Peripheral) 1 which has a function of an image scanner according to an embodiment of the invention. FIG. 2 shows a perspective view of the MFP 1 when a body cover 12 is opened. According to the exemplary embodiment, the MFP 1 has at least functions of image scanner, printer, copier and facsimile machine.

The MFP 1 is provided with a sheet tray 17 which supplies recording sheets 18 (see FIG. 3) on which images are formed (printed), a main body 10 accommodating components for forming the images on the recording sheets 18 fed from the sheet tray 17, and the body cover 12 which is pivoted to the main body 10 to openably cover an upper part of the main body 10.

The main body 10 is provided with a scanning unit 40 for scanning an image on an original document 19 (hereinafter, occasionally described as "scanning the original document 19"), an image forming unit 2 for forming an image on a recording sheet 18, and an operation unit 14 which is operated by a user to input information/commands to operate the MFP 1. The scanning unit 40 and the image forming unit 2 are accommodated in a casing 11 of the main body 10.

The casing 11 is provided with a scanning plate 11A on which the original document 19 to be scanned is placed, a manual feed unit 8 for manually (without using the sheet tray 17) feeding the recording sheets 18 toward the image forming unit 2, and sheet ejection unit 7 at which the recording sheets 18 on which images are formed by the image forming unit 2 are discharged. The scanning plate 11A is a plate member formed with transparent material such as glass, and fixed on the upper surface of the casing 11 and faces the body cover 12.

The operation unit 14 is provided with selection keys 14A for selecting a desired function from among a plurality of functions provided to the MFP 1, a start key 14B for starting the desired function selected by one of the selection keys 14A, a display unit 15 for displaying various pieces of information including an operational condition of the MFP 1, a menu key 14C for displaying menu on the display unit 15, a cross key for operating the menu, and a cancel key 14E for canceling operations of the MFP 1.

As described above, the selection keys 14A are used for selecting a desired function. Specifically, the selection keys 14A include a copy key for selecting the copier function, a facsimile key for selecting the facsimile function (which is divided into a facsimile transmission function and a facsimile receiving function), and a scanner key for selecting the scanner function. When the user operates one of the selection keys 14A to select the desired function, some of the keys of the operation unit 14 are assigned to specific functions for the selected operation, and display unit 15 displays images and information for the selected operation. Thus, when the user selects the desired operation, the operational environment provided by the operation unit 14 is changed in accordance with the selected function.

When the user operates the menu key 14C, a menu having a hierarchical structure is displayed on the display unit 15. When such a menu is displayed on the display unit 15, by operating right/left sections of the cross key 14D, the hierarchical level of the menu can be changed. Further, by operating up/low sections of the cross key 14D, menu items of each hierarchical level can be highlighted. By operating a central section of the cross key 14D, selection of the highlighted item is established and an operation corresponding to the selected item is executed.

Figure 3:
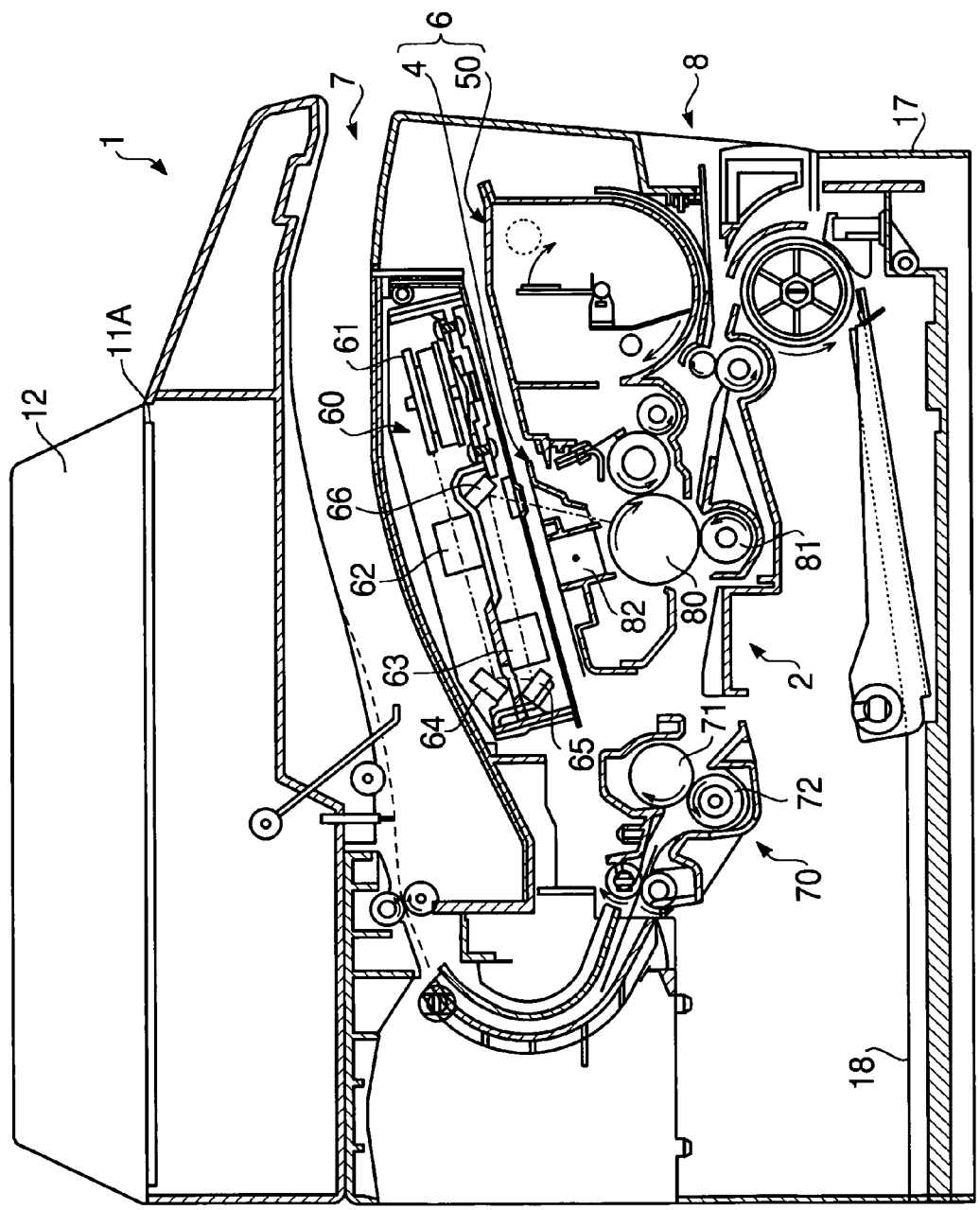
FIG. 3 is a cross sectional view schematically showing main components of the MFP shown in FIG. 1.

Next, referring to the cross sectional view shown in FIG. 3, which schematically shows a structure inside the main body 10 of the MFP 1, the image forming unit 2 will be described.

The image forming unit 2 includes a scanner unit 60 which emits scanning laser beam to form a latent image on a photoreceptor drum, a process cartridge 6 which develops the latent image by applying toner thereon and transfer the developed image (i.e., toner image) on the recording sheet 18, and a fixing unit 70 which fixes the toner image transferred onto the recording sheet 18.

Specifically, the scanner unit 60 includes a laser diode (not shown) which emits a laser beam for forming the latent image on the photoreceptor drum 80, a polygonal mirror 61 which is driven to rotate and reflect the laser beam emitted by the laser diode so that the laser beam is scanned, and an optical system including lenses 62 and 63 for converging the laser beam and mirrors 64, 65 and 66. With this configuration, in the scanner unit 60, the laser beam emitted by the laser diode is deflected by the polygonal mirror 6. By the optical system, the laser beam is converged and the optical path is changed so that the high-speed scanning laser beam is incident on the surface of the photoreceptor drum 80.

The process cartridge 6 is configured such that a so-called electrophotographic imaging process, and includes a drum cartridge 4, and a developing cartridge 50 which is detachably coupled to the drum cartridge and accommodates toner (not shown).

The drum cartridge 4 is a subject on which the laser beam impinges, and is provided with the photoreceptor drum 80, a charger 82 for charging the photoreceptor drum 80, and a transfer roller 81 which is used for transferring the toner image formed on the photoreceptor drum 80 onto the recording sheet 18, which passes through the nip between the photoreceptor drum 80 and transfer roller 81.

The fixing unit 70 includes a heat roller 71 and a pressure roller 72. As the recording sheet 18 on which the toner image is transferred passes through the nip between the heat roller 71 and pressure roller 72, the pressure and heat are applied to the toner image, and the toner image is fixed onto the recording sheet 18.

Thus, by the scanning laser beam emitted by the scanner unit 60, the latent image is formed on the photoreceptor drum 80. The latent image is developed as the toner, which is supplied by the developing cartridge 50, is applied to the latent image. Then, when the recording sheet 18 fed from the sheet tray 17 passes through the process cartridge 6, the toner image is transferred onto the recording sheet 18. The toner image is then fixed on the recording sheet 18 at the fixing unit 70.

Figure 4:
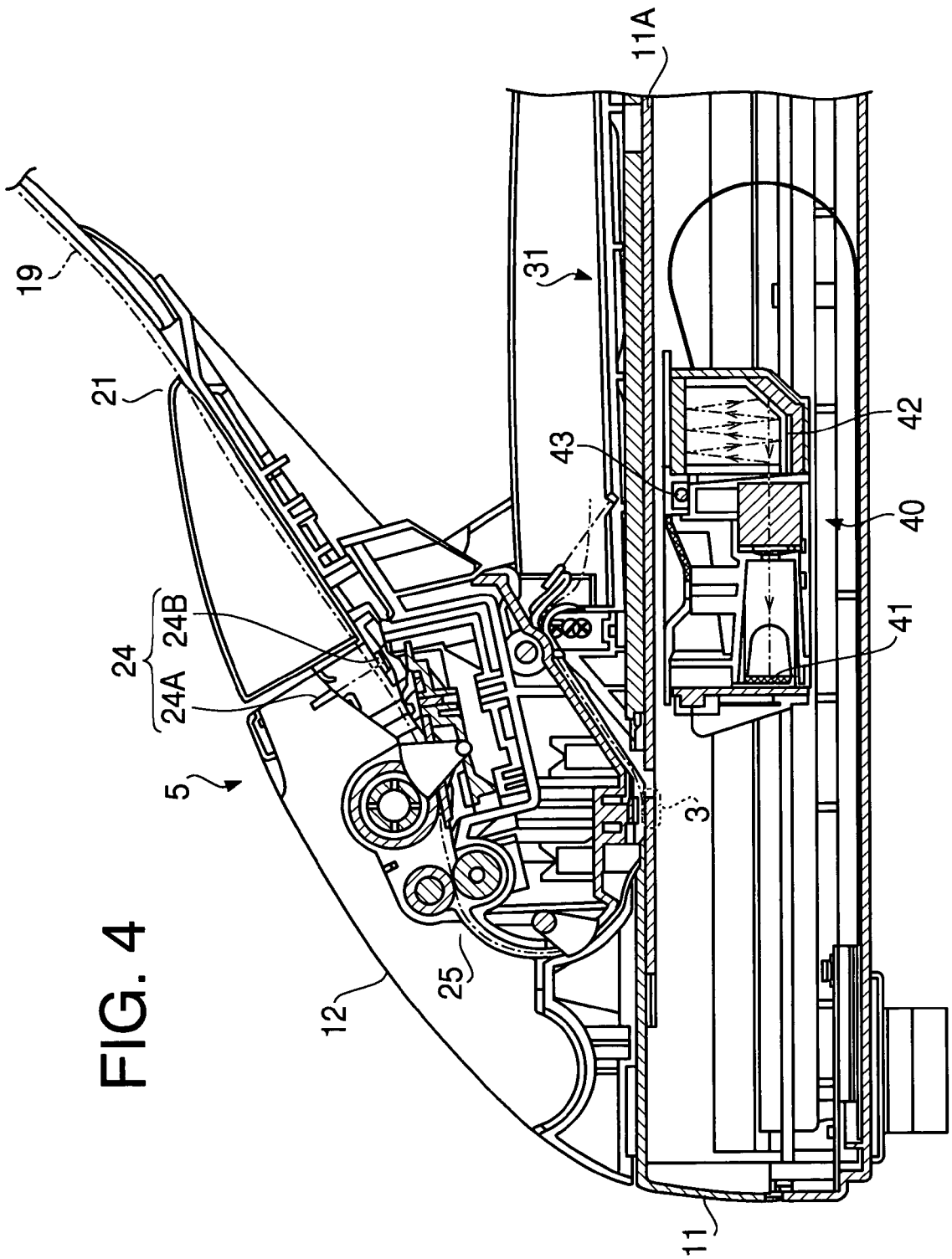
FIG. 4 is a cross sectional view schematically showing main components of the MFP shown in FIG. 1.

FIG. 4 is a cross sectional view schematically showing a configuration of body cover 12 and the scanning unit 40. As shown in FIG. 4, the body cover 12 is provided with a document feeding section 21 (see FIG. 2) on which the original document 19 before scanned is placed, a document reception section 31 on which the scanned documents 19 are stacked, and a document feeding unit 25 for feeding the original document 19 from the document feeding section 21 to the document receiving section 31 via a fed document scanning position 3 of the scanning plate 11A. It should be noted that the original document 19 fed from the document feeding section 19 is scanned at the fed document scanning position 3 with the scanning unit 40 stayed thereat, and then further fed to the document receiving section 31. In the following description, the document feeding section 21, document receiving section 31 and the document feeding unit 25 will be referred to by a generic name "automatic document feeder 5."

Further, as shown in FIG. 4, the scanning unit 40 is provided with a light source 43 for illuminating the original document 19 to be scanned, an image sensor 41 for receiving the light reflected by the original document 19, and optical elements 42 including mirrors and lenses for converging and directing the light reflected by the original document 19 toward the image sensor 41. The scanning unit 40 illuminates the original document 19 with the light emitted by the light source 43, converges the light reflected by the original document 19 with the optical elements 42, and receiving the converged light with the image sensor 41, thereby scanning the image on the original document 19.

In FIG. 4, the scanning unit 40 is located at a position on right-hand side of the fed document scanning position. According to the embodiment, the scanning unit 40 is movable in a direction parallel to a longer side of the casing 11 along the scanning plate 11A (i.e., the right and left direction in FIG. 4), and by locating the scanning unit 40 on the leftmost side within its movable range, a portion of the original document 19 facing the fed document scanning position 3 is scanned.

When the scanning operation is executed using the automatic document feeder (hereinafter, referred to as ADF) 5, as described above, the scanning unit 40 is held at the position opposite to the fed document scanning position 3, and scans the image on the original document 19 as it passes the fed document scanning position 3.

When a document placed to cover the scanning plate 11A (i.e., if the scanner unit 40 is used as a flatbed type scanner), the scanning unit 40 is driven to move relative to the original document 19 to scan the entire image on the original document 19.

The document feeding section 21 is provided with a first document sensor 24 for detecting that the document 19 is placed on the document feeding section 21. The casing 11 is provided with a second document sensor 35 (see FIG. 5) for detecting that the document 19 is placed on the scanning plate 11A. In the following description, the first document sensor 24 and the second document sensor 35 are referred to by a generic name of a "document sensor 92 (see FIG. 5)."

The first document sensor 24 is a light sensor which includes a light emitting unit 24A and a light receiving unit 24B for receiving the light emitted by the light emitting unit 24A, and the second document sensor 35 is also a light sensor which includes a light emitting unit 35A and a light receiving unit 35B for receiving the light emitted by the light emitting unit 35A. The light emitting unit 24A and the light receiving unit 24B are arranged such that, when the document 19 exists, the light directed from the light emitting unit 24A to the light receiving unit 24B is blocked by the document 19. Similarly, the light emitting unit 35A and the light receiving unit 35B are arranged such that, when the document 19 exists, the light directed from the light emitting unit 35A to the light receiving unit 35B is blocked by the document 19.

The second sensor 35 is configured such that the light emitted by the light emitting unit 35A is received by the light receiving unit 35B when the body cover 12 is closed. Specifically, the light receiving unit 35B is arranged at a position spaced from a movable range of the scanning unit 40 inside the casing 11 so as not interfere with the scanning unit 40 as it moves, and the light emitting unit 35A is arranged inside the body cover 12.

Therefore, the document sensor 92 functions such that, when the original document 19 is not present at the position of the document sensor 92 (i.e., the first sensor 24 or the second sensor 35), the light emitted by the light emitting unit 24A is received by the light receiving unit 24B, and the light emitted by the light emitting unit 35A is received by the light receiving unit 35B. In this case, a light reception signal of relatively a large amplitude is output by the document sensor 92. When the original document 19 is located at the position of the document sensor 92, the light emitted by the light emitting unit 24A or 35A is blocked by the document 19 and is not received by the light receiving unit 24B or 35B. In this case, the light reception signal of relatively a small amplitude is output by the document sensor 92.

Figure 5:
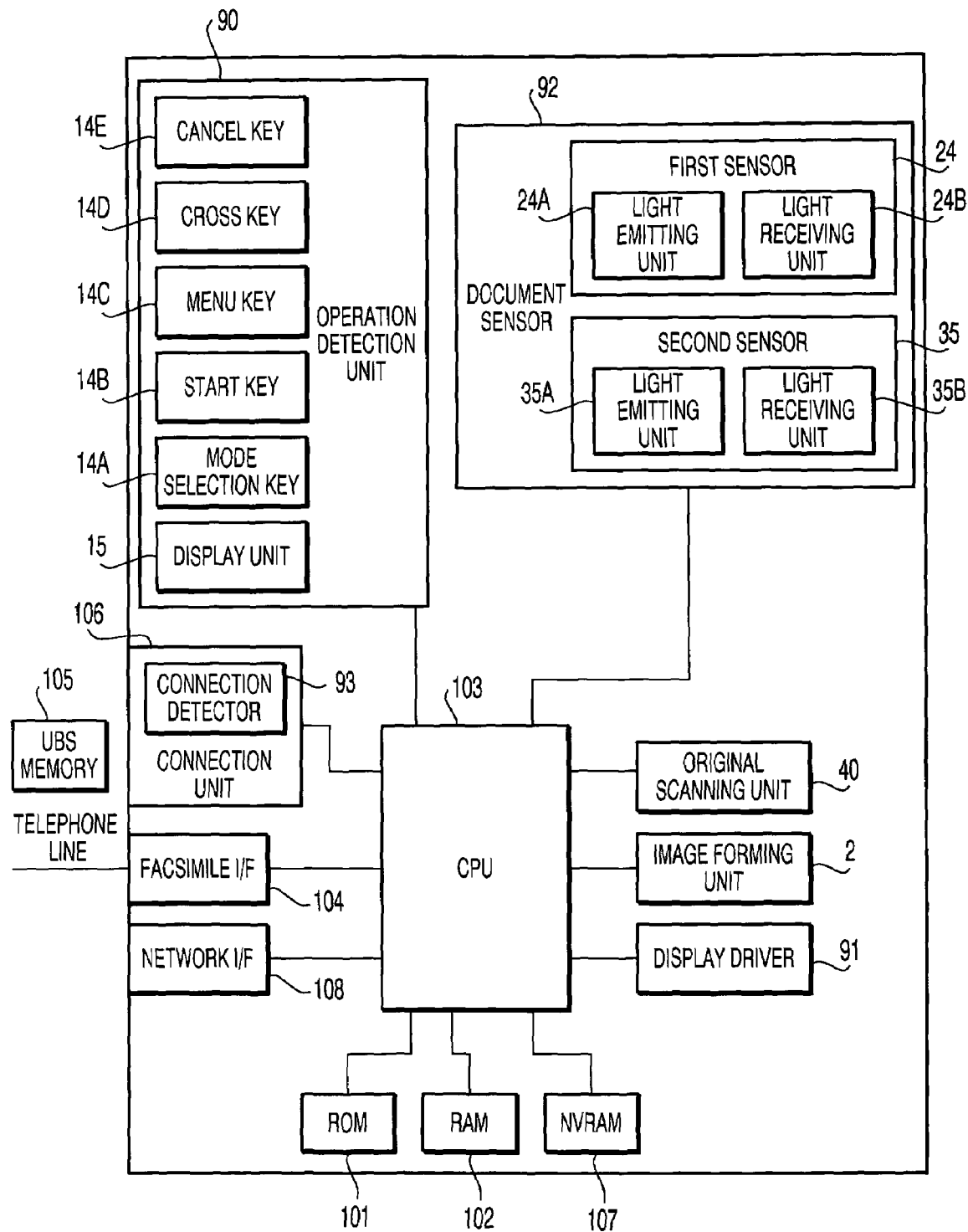
FIG. 5 is a block diagram showing a control system of the MFP shown in FIG. 1.

FIG. 5 shows a block diagram illustrating a configuration of a control system of the MFP 1 according to the embodiment. The MFP 1 is provided with a network I/F (interface) 108 for connecting the MFP 1 to an external device such as a PC (personal computer) or a network (not shown) such as the Internet, a facsimile I/F 104 for connecting the MFP 1 to a public telephone network, a connecting terminal 106 to which an external storage such as a USB memory 105 can be detachably connected, a ROM (Read Only Memory) 101 for storing programs for controlling various operations of the MFP 1, a RAM (Random Access Memory) 102, an NVRAM (Non-volatile RAM) 107 for storing data to be retained even if the MFP 1 is powered off and a CPU 103 for executing the programs stored in the ROM 101.

To the CPU 103, the scanning unit 40, image forming unit 10, display driver 91 for displaying an image on the display unit 15, operation detecting unit 90 for detecting that the operation unit 14 is operated, and the document sensor 92 are connected.

The connecting terminal 106 is configured such that, when the USB memory 105 is connected, electricity is supplied to the USB memory 105. The connecting terminal 106 is provided with a connection detector 93 for detecting the connection of the USB memory 105. According to the embodiment, various formats of data are stored; for example, generally used image data such as JPEG data, TIFF data, document data created by generally used word processing software and/or PDF format data, a file generated from print data output by a printer driver.

Next, Scan to USB processes for scanning an image on the original document 19 and store data representing the scanned image in the USB memory 105 will be described.

Figure 6:
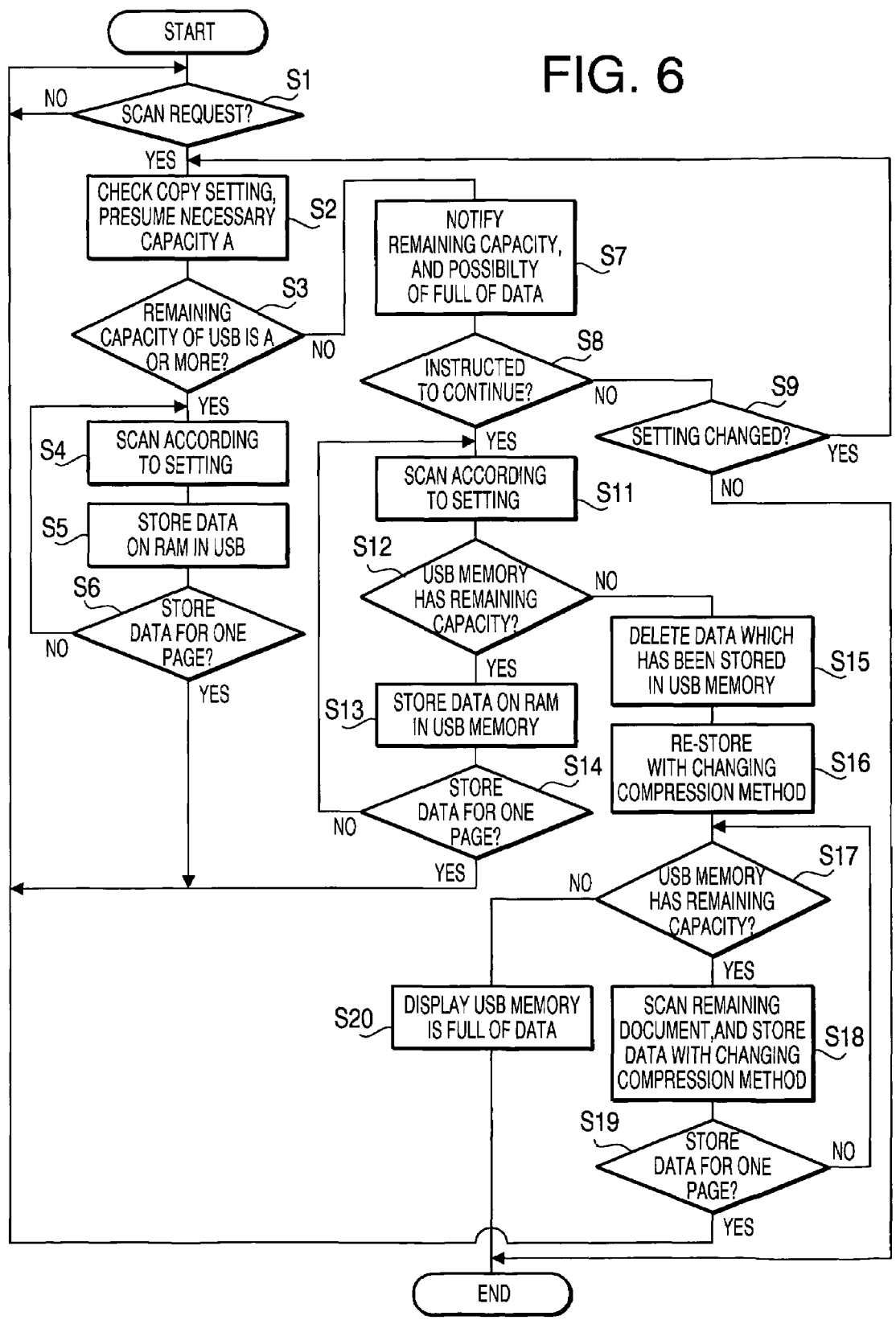
FIG. 6 is a flowchart illustrating a first Scan to USB process according to the embodiment of the invention.

FIG. 6 is a flowchart illustrating a first Scan to USB process for scanning image on the original document 19 placed on the scanning plate 11A and storing the data representing the scanned image in the USB memory 105.

The first Scan to USB process is started when the scanner function is selected using the operation selection keys 14A, and after the USB memory 105 is connected to the connecting terminal 106 the USB memory 105 is designated using the cross key 14D as a destination in which the data is to be stored. Incidentally, the first Scan to USB process is executed by the CPU 103 based on a program stored in the ROM 101 on condition that the original document 19 placed on the scanning plate 11A is detected by the second sensor 35.

As shown in FIG. 6, when the first Scan to USB process is started, the process judges whether a request for scan is made by depressing the start key 14B (S1). If the scan request is not made (S1: NO), the process waits for the request (S1). If the scan request is made (S1: YES), the process proceeds to S2. In S2, the process checks preliminarily set (or default settings of) copy setting including resolution setting, scanning size setting and color setting, and presumes a necessary capacity A to be remained in the USB memory 105 for storing the data corresponding to the image of the original document to be scanned. In S3, the process detects the remaining capacity of the USB memory 105 and judges whether the remaining capacity of the USB memory 105 is equal to or greater than the presuming amount A.

If the remaining capacity is equal to or greater than the presuming amount A (S3: YES), the process proceeds to S4 and executes a scanning using the scanning unit 40 in accordance with the current setting, and stores the data corresponding to the scanned image of the original document 19 in the RAM 102. Then, in S5, the data stored in the RAM 102 is copied to the USB memory 105. In S6, the process judges whether the data corresponding to one whole page of the original document 19 placed on the scanning plate 11A is stored in the USB memory 105. If the data corresponding to one page of the original document 19 has not been stored in the USB memory 105 (S6: NO), the process repeats steps S4 and S5. When the data corresponding to one page of the original document 19 has been stored in the USB memory 105 (S6: YES), the process returns to S1 and waits for the next request for scanning.

If the remaining capacity of the USB memory 105 is less than the necessary capacity A (S3: NO), the process notifies, by displaying messages on the display unit 15, that there is a possibility that the USB memory 105 becomes full together with the remaining capacity of the USB memory 105. When this notification is made, the user can select whether to continue the process, change the copy setting or cancel the process by operating the cross key 14D or the like.

In S8, the process judges whether continuation of the process is instructed. If the continuation of the process is not instructed (S8: NO), the process judges, in S9, whether the copy settings have been changed. If the copy settings have not been changed, that is cancellation of the process has been instructed (S9: NO), the process is terminated. If the copy settings have been changed (S9: YES), the process returns to S2 and the necessary capacity A is obtained based on the changed copy settings.

If continuation of the process has been instructed (S8: YES), the process executes the scanning in accordance with the settings as in S4, and stores the data corresponding to the image on the original document 19 in the RAM 102. In S12, the process judges whether the USB memory 105 has remaining capacity. If the USB memory 105 has the remaining capacity (S12: YES), the process stores the data which has been stored in the RAM 102 is stored in the USB memory 105. In S15, the process judges, as in S6, whether the data for one page has been stored. If not (S15: NO), the process returns to S11. As above, steps S11-S13 are repeatedly executed. If the USB memory 105 is not full (S12: YES) and the data for one page is stored in the USB memory 105 (S14: YES), the process returns to S1, and waits for another scan request for the next page of the original document 19.

If, before the data for one page has been stored in the USB memory 105 (S14: NO), the USB memory 105 becomes full (S12: NO), the process deletes the data part of which has been stored in the USB 105. It should be noted that the data obtained by scanning is stored in the RAM 102 without being compressed. Thereafter, the data is compressed to well-know format such as JPEG or TIFF format. Then, the compressed data (scan data) is stored in the USB memory 105. The compression of the data is executed on a page basis. In S16, the data having been scanned and stored as compressed data in the RAM 102 is re-compressed in accordance with another compression method and stored in the USB memory 105 in order to reduce the size of the compressed data. In S17, the process judges whether the USB memory 105 has a remaining capacity. If the USB memory 105 has a remaining capacity (S17: YES), the process proceeds to S18. In S18, the remaining part of the original document 19 is scanned in accordance with the current settings, and stores the obtained data in the USB memory 105 with compressing in accordance with the changed method as in S16.

In S19, similarly as in S6 or S14, the process judges whether the data for one page has been stored. If not (S19: NO), the process returns to S17.

As above, S17 and S18 are repeatedly executed, and if the USB memory 105 is not full (S17: YES) and the data for one page is stored in the USB memory 105 (S19: YES), the process proceeds to S1, and waits for another scan request for the next page.

If, after the compression method has been changed, the remaining capacity of the USB memory 105 is exhausted (S17: NO) before the data for one page is completely stored in the USB memory 105 (S19: NO), a notification of memory full condition is displayed on the display unit 15 (S20), and the process is terminated. In such a case, the user can restart the process after dealing with the memory full condition by, for example, deleting unnecessary files stored in the USB memory 105.

As above, according to the first Scan to USB process, after the copy settings are made, the necessary capacity A is presumed (S2), and if the remaining capacity of the USB memory 105 is less than the presumed necessary capacity A (S7). Therefore, a case where the USB memory 105 becomes full on the process of storing the data corresponding to the image scanned from the original document 19 and/or a case where a warning is issued although the remaining capacity of the USB memory 105 is sufficient for storing the data can be well suppressed. Further, according to the embodiment, when the warning is issued, the copy settings can be changed (S9) and/or the compression method can be changed (S15-S19) in order to reduce the data size. Therefore, operability/convenience is improved.

Figure 7:
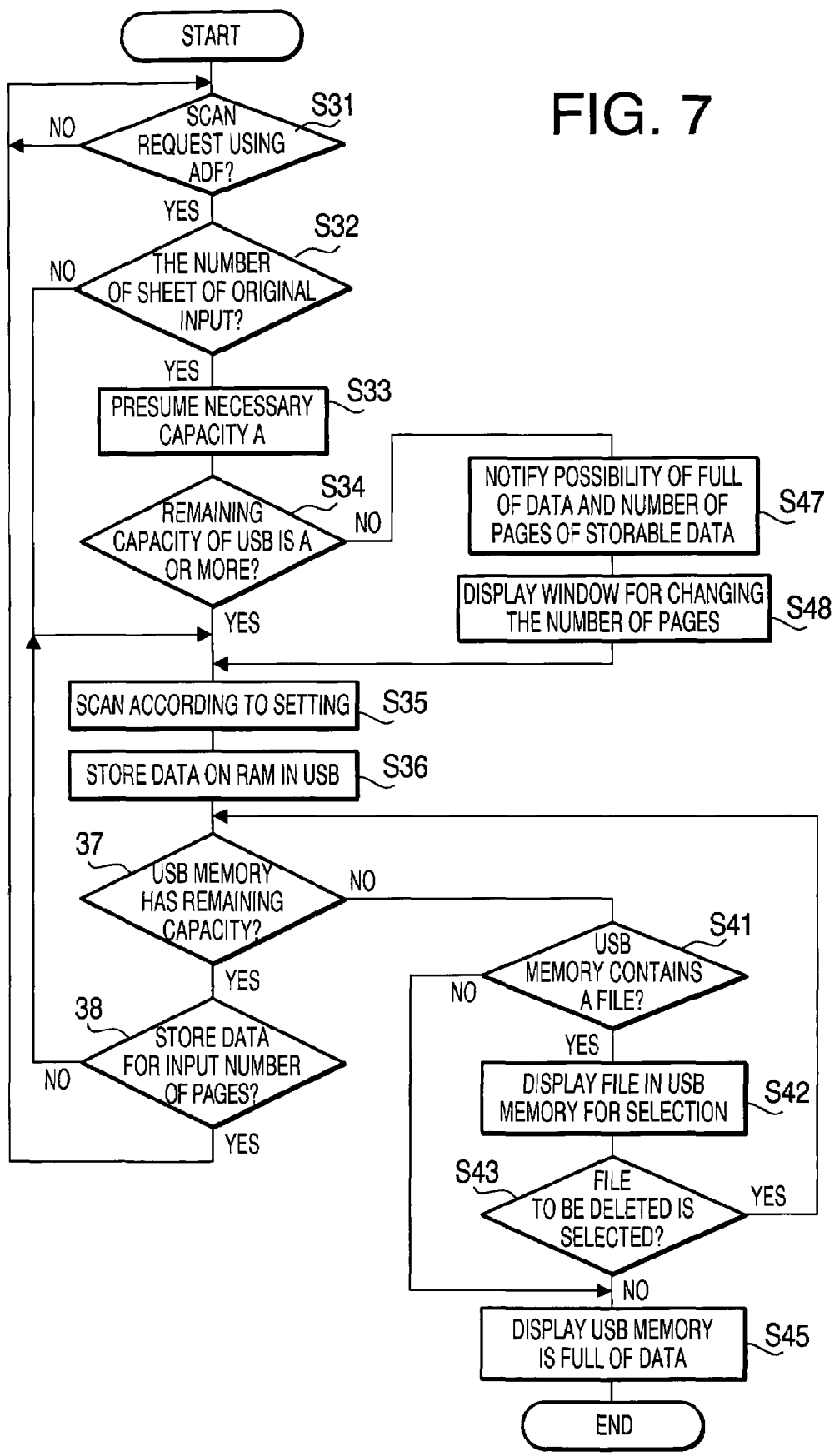
FIG. 7 is a flowchart illustrating a second Scan to USB process according to the embodiment of the invention.

FIG. 7 shows a flowchart illustrating a second Scan to USB process, in which the image on the original document 19 is scanned with feeding the original document 19 using the automatic document feeder (ADF) 5, and the data corresponding to the scanned image is stored in the USB memory 105.

The second Scan to USB process is started when the user executes a log-in procedure using personal ID, selects the scanning function by operating the operation selection keys 14A, the USB memory 105 is connected to the connection terminal 106, and the user designates, with use of the cross key 14D, the USB memory 105 as the destination in which the data is stored. It should be noted that the second Scan to USB process is performed as the CPU 103 executes the program stored in the ROM 101 on condition that the original document 19 placed on the document feeding section 21 is detected with by the first sensor 24.

When the second Scan to USB process is started, in S31, the process judges whether the user depresses the start key 14B to make a scan request using the ADF 5. If the scan request is not made (S31: NO), the process waits for the scan request (S31). If the scan request is made (S31: YES), the process proceeds to S32, in which the process judges whether the number of sheets of the original document 19 has been input using the operation unit 14. If the number of the sheets of the original document 19 has been input (S32: YES), the process proceeds to S33.

In S33, the process presumes a necessary capacity A for storing the data corresponding to the input number of sheets of the original document based on a mean coverage (e.g., the average ratio of the number of printed dots to the total number of dots within a unit area). IT should be noted that the NVRAM 107 includes an area storing an accumulated number representing the number of pages having been scanned and the mean coverage. When the scanning of the n-th page is finished, the mean coverage is calculated in accordance with the following formula:

$$\text{Mean Coverage for } n \text{ pages} = [\text{mean coverage for } (n-1) \text{ pages} \times (n-1) + \text{the latest coverage}]/n$$

The mean coverage and the accumulated number of scanned pages can be stored for each of the log-in user.

The data is compressed in accordance with the well-known compression method such as one for creating JPEG, TIFF or RLE file. Once the scanning setting (i.e., the size of a page of the original document, a scanning solution and depth (gradation steps) of the color components) of the scanning unit 40 is known, the size of the scan data before compressed can be calculated. It is known that, if the mean coverage is the substantially the same, the compression ratio is substantially the same as the mean coverage. That is, it is generally known that the mean coverage and the compression ratio has a predetermined correlation. According to the embodiment, a table (see FIG. 8) indicating the mean coverage values and presumed compression ratios $\alpha_c$ and $\beta_s$ (c being the value of the mean coverage) corresponding to the mean coverage values are stored in the ROM 101. Based on the mean coverage value, the presumed compression ratio can be obtained. Then, by multiplying the size of the scan data with the presumed compression ratio, the size of the compressed data can be presumed. If the mean coverage value is not included in the table, a linear interpolation is performed to obtain the corresponding compression ratio. If the accumulated number of pages and the mean coverage value are stored for each user, the compression ratio can also be obtained for each user, and thus, the size of the compressed data can be presumed more accurately.

In S34, the process detects the remaining capacity of the USB memory 105, and judges whether the remaining capacity of the USB memory 105 is equal to or greater than the necessary capacity A.

If the remaining capacity of the USB memory 105 is equal to or greater than the necessary capacity A (S34: YES), the process proceeds to S35, where each sheet of the original document 19 is fed by the ADF 5, scanning is executed by the scanning unit 40 according to the current settings, and the obtained data is stored in the RAM 102. Then, in S36, the process stores the data stored in the RAM 102 in the USB memory 105 with monitoring the remaining capacity of the USB memory (S37). If the USB memory 105 has the remaining capacity (S37: YES), the process judges whether the data for the input number of pages has been stored in the USB memory 105 (S38). If the data for the input number of pages has not been stored in the USB memory 105 (S38: NO), the process repeats steps S35-S37. If the USB memory 105 is not full (S37: YES) and the data for the input number of pages has been stored in the USB memory 104 (S38: YES), the process proceeds to S31 and waits for the next scan request.

If the remaining capacity of the USB memory 105 has been exhausted (S37: NO) before the data for the input number of pages is stored (S38: NO), the process judges whether the USB memory 105 stores one or more files (S41). If the USB memory 105 stores one or more files (S41: YES), the process displays the file name(s) on the display unit 15 and requires the user to select the file(s) to be deleted (S42). In S43, the process judges whether the user selected the file(s) to be deleted. If the user selected the file(s) (S43: YES), the process deletes the selected file(s) and proceeds to S37. Then, the steps S35-S38 are executed again with the remaining capacity of the USB memory 105 being increased by the amount corresponding to the deleted file(s).

If there is no file stored in the USB memory 105 (S41: NO) or the user does not select the file to be deleted (S43: NO), the process displays a notification indicating that the USB memory 105 is full on the display unit 15 (S45), and the process is terminated.

If the process judges that the remaining capacity of the USB memory 105 is less than the necessary capacity A (S34: NO), the process notifies that the USB memory 105 may become full and a possible number of pages the USB memory 105 is capable of storing with the current remaining capacity by displaying a message on the display unit 15 (S47). In S48, the process displays a window for changing the number of pages of the original document 19 to be scanned on the display unit 15. When the user changes the number of pages or instructs to continue without changing the number of pages through the window, the process proceeds to S35.

If the number of sheets of the original document 19 has not been input (S32: NO), the process cannot presume the necessary capacity A. In such a case, the process proceeds from S32 to S35. That is, in this case, the process presumes that the USB memory 105 has sufficient capacity. It should be noted that, if the number of sheets has not been input, in S38, the process judges whether the original document 19 is absent based on the detection of the first sensor 24. If the original document 19 is absent (S38: YES), the process returns to S31, while if the original document 19 is present (S38: NO), the process returns to S35.

As described above, according to the second Scan to USB process, the process presumes the necessary capacity A based on the past mean coverage of the login user (S33), and if the remaining capacity of the USB memory 105 is less than the presumed necessary capacity A, the warning is issued (S34). Therefore, a case where the USB memory 105 becomes full during the process of storing the data corresponding to the image scanned from the original document 19 and/or a case where a warning is issued although the remaining capacity of the USB memory 105 is sufficient for storing the data can be well suppressed. Generally, different users have different types of original documents 19 subject to the Scan to USB process. By referring to the past mean coverage of individual user, the necessary capacity A can be presumed accurately.

Further to the above configuration, according to the second Scan to USB process, when the warning is issued, the user can change the number of sheets to be scanned (S48) and if the memory full condition occurs, the user is allowed to delete unnecessary files stored in the USB memory 105 to increase the remaining capacity. Therefore, the usability and convenience of the image scanning device are improved.

It should be noted that, although the invention is described based on the exemplary embodiment, the invention should not be limited to the configuration of the embodiment. Various modifications can be made without departing from the scope of the invention.

For example, in the second Scan to USB process, the process presumes the necessary capacity A based on the past mean coverage of the login user (S33). Instead of this configuration, the necessary capacity A may be presumed based on the mean coverage of all the operations associated with the scanning operation of the MFP 1 or all the executions of the second Scan to USB process in the past.

If each USB memory 105 is identified based on its intrinsic ID or the like, the necessary capacity A may be presumed based on the mean coverage corresponding to the USB memory 105. The type of the original document 19 to be scanned may be different depending on the user, company and the like, and the USB memories 105 may be provided to respective users, companies and the like. Therefore, by referring to the past mean coverage corresponding to the USB 105, the necessary capacity A may be calculated accurately.

It should be noted that S2 of FIG. 6 and S33 of FIG. 7 can be exchanged. Further, S15-S19 of FIG. 6 and S41-S43 of FIG. 7 can also be exchanged.

In the foregoing description, for storing the data obtained by scanning the original document 19, the USB memory 105 is used. The invention need not be limited to such a configuration and any other portable storage such as memory card may be used.

What is claimed is:

1. An image scanning device comprising:
an image scanning unit configured to scan an image formed on an original document and generate data representing the scanned image;
a data storing unit configured to store the data generated by the image scanning unit in an external storage when the external storage is connected to the image scanning device;
a capacity presuming unit configured to presume a necessary capacity which should be available in the external storage for storing the data generated by the image scanning unit prior to storing the data;

a comparing unit configured to detect a remaining capacity of the external storage and compare the remaining capacity with the necessary capacity presumed by the capacity presuming unit; and a warning unit configured to issue a warning if the remaining capacity is less than the necessary capacity.

2. The image scanning device according to claim 1, further comprising a mean coverage acquiring unit configured to acquire a mean coverage of data corresponding to images scanned by the scanning unit in the past, wherein the capacity presuming unit presumes the necessary capacity in accordance with the mean coverage acquired by the mean coverage acquiring unit.

3. The image scanning device according to claim 2, further comprising a user identifying unit configured to identify a user of the image scanning device, wherein the mean coverage acquiring unit acquires the mean coverage for each user of the image scanning device, and wherein the capacity presuming unit presumes the necessary capacity in accordance with the mean coverage which is acquired, by the mean coverage acquiring unit, corresponding to the user identified by the user identifying unit.

4. The image scanning device according to claim 2, further comprising an external storage identifying unit configured to identify the external storage connected to the image scanning device, wherein the mean coverage acquiring unit acquires the mean coverage for each user of the image scanning device, and wherein the capacity presuming unit presumes the necessary capacity in accordance with the mean coverage which is acquired by the mean coverage acquiring unit corresponding to the user identified by the user identifying unit.

5. The image scanning device according to claim 2, wherein the mean coverage acquiring unit acquires the mean coverage corresponding to all the scanning operations of the image scanning device, wherein the capacity presuming unit presumes the necessary capacity based on the mean coverage corresponding to all the operations of the image scanning device.

6. The image scanning device according to claim 1, wherein the scanning unit is configured to scan a plurality of sheets of the original document by feeding the plurality of sheets automatically and consecutively, wherein the image scanning device further comprises an input unit configured to allow the user to input a number of sheets of the original document to be scanned, and wherein the capacity presuming unit presumes the necessary capacity based on the number of sheets input through the input unit.

7. The image scanning device according to claim 1, further comprising a notifying unit configured to notify the user, when the remaining capacity of the external storage has been exhausted when the data is being stored in the external storage, of a full status of the external storage.

8. The image scanning device according to claim 1, further comprising a re-storing unit configured to delete the data having been stored in the external storage when the remaining capacity of the external storage has been exhausted when the data is being stored in the external storage, and attempts to store the data in the external storage in accordance with a different storing format.

9. The image scanning device according to claim 8, wherein the different storing format is realized by employing a different compression method.

10. A method of storing data for an image scanning device to which an external storage is detachably connected and the data acquired by scanning an image is stored in the external storage, the method comprising the steps of:

scanning an image formed on an original document and generate the data representing the scanned image;

storing the data in the external storage;

presuming a necessary capacity which should be available in the external storage for storing the data prior to storing the data in the external storage;

detecting a remaining capacity of the external storage;

comparing the remaining capacity with the necessary capacity; and issuing a warning if the remaining capacity is less than the necessary capacity.

11. An image scanning device comprising:

an image scanning unit configured to scan an image formed on an original document and generate data representing the scanned image;

a processing unit; and a memory having machine-readable instructions stored thereon that, when executed by the processing unit, cause the image scanning device to provide a data storing unit that stores the data generated by the image scanning unit in an external storage connected to the image scanning device;

a capacity presuming unit that presumes a necessary capacity which should be available in the external storage for storing the data generated by the image scanning unit prior to storing the data;

a comparing unit that detects a remaining capacity of the external storage and compare the remaining capacity with the necessary capacity presumed by the capacity presuming unit; and a warning unit that issues a warning if the remaining capacity is less than the necessary capacity.

* * * * *